O. ADAM.
ELECTRICAL CABLEWAY SYSTEM.
APPLICATION FILED APR. 20, 1908.
943,509.
Patented Dec. 14, 1909.
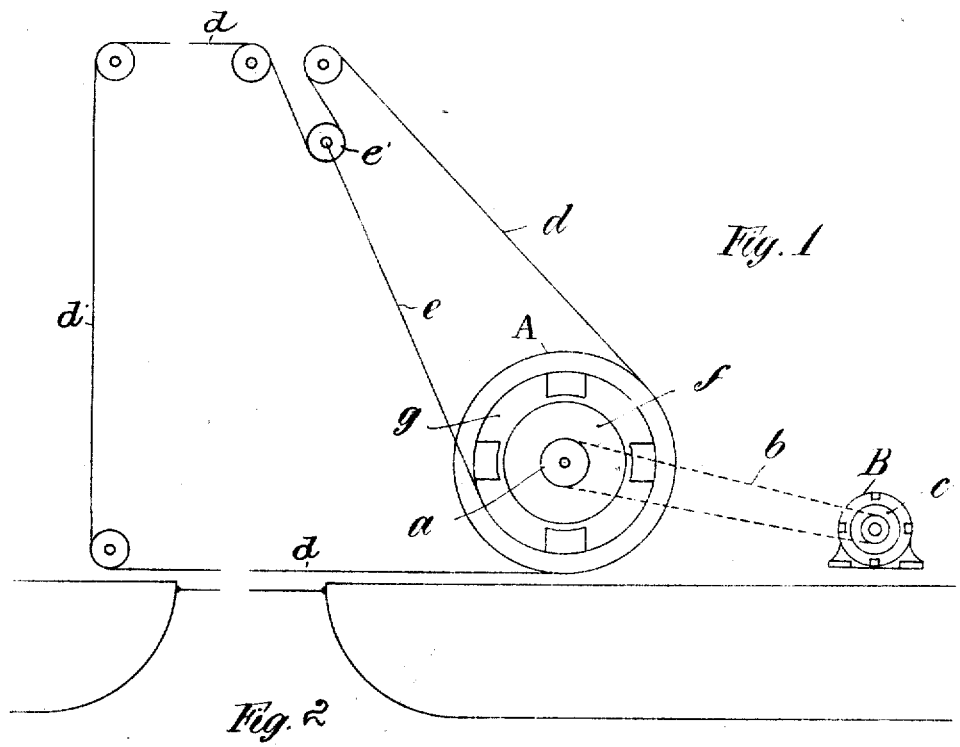
Fig. 1
Fig. 2
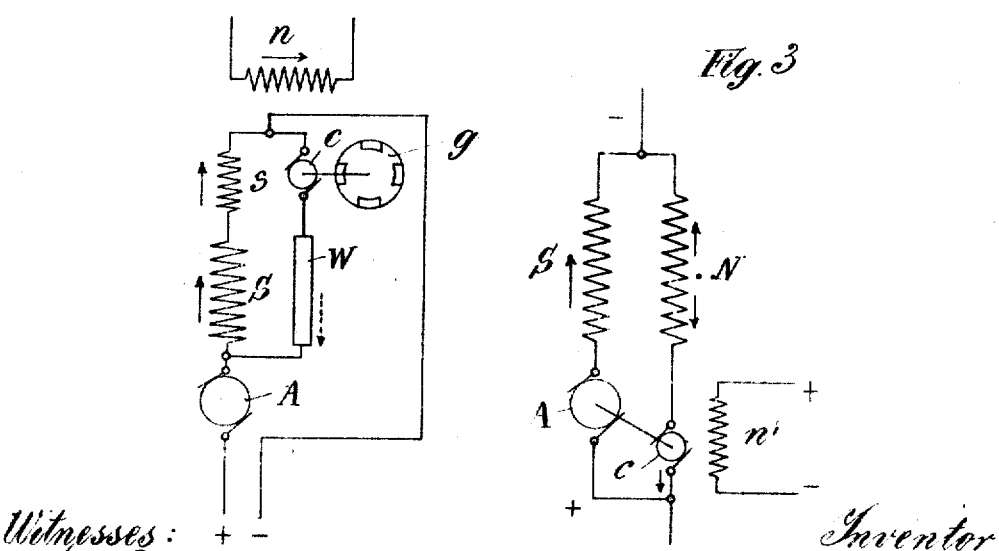
Fig. 3
Witnesses:
Inventor
Otto Adam,
By his Attorney

UNITED STATES PATENT OFFICE.

OTTO ADAM, OF DRESDEN, GERMANY.

ELECTRICAL CABLEWAY SYSTEM.

943,509.  Specification of Letters Patent.  Patented Dec. 14, 1909.

Application filed April 20, 1908. Serial No. 428,035.

*To all whom it may concern:*

Be it known that I, OTTO ADAM, chief engineer, a subject of the German Emperor, residing at Uhlandstrasse 37, Dresden, Kingdom of Saxony, Germany, have invented new and useful Improvements in Electrical Cableway Systems, of which the following is a specification.

The invention relates to improvements in the type of electrically actuated cable systems illustrated in my former patent No. 820,464, dated March 15, 1906. In the cable system illustrated in said patent there was employed a series or compound motor for maintaining the normal tension on the traveling cable, and as is well known such a motor increases its speed upon a decrease of load. When the apparatus was employed between two ships for loading coal at sea the traveling cable and tensioning or straining rope both became slack as the vessels approached each other. This slacking of the traveling cable permitted the part of the motor (the field frame) operating the straining rope to begin its rotation to wind up the straining rope. As this rotation of the field frame increased the relative number of rotations per unit of time of the armature with respect to the field, while the actual speed of the armature remained substantially constant, the counter E. M. F. developed by the motor increased, and the current of the motor and therefore the torque decreased, consequently, the motor did not respond as quickly in winding up the straining rope to restore the normal tension on the traveling cable as would have been the case had the torque of the motor been maintained constant, under the relatively increased speed of the armature with respect to the field.

Inasmuch as vessels in a heavy sea way approach each other very quickly and at rapidly recurring intervals, due to the wave action, it is necessary to maintain the proper tension on the traveling cable that the motor part actuating the straining rope of the cable responds quickly to wind up the straining rope. In the patent aforesaid the responsive action of the motor in restoring the tension of the cable was not quick enough and it is an essential purpose of the present invention to correct this difficulty.

In the accompanying drawings: Figure 1 is a diagrammatic view of a cable system involving the invention, Figs. 2 and 3 show modified forms of connecting the operating motor and the regulating dynamo electric-machine.

Referring to the drawings it will be noted that the two vessels are connected by a suitable tow-rope, and between the vessels passes the endless traveling cable $d$ passing over suitable guide sheaves on each vessel and around a pulley or driving drum operated by a rotating field frame $g$ of the motor A. A tension or straining rope $e$ is connected at one end to a pulley $e'$ engaging the upper reach of cable $d$ and is connected at its other end to a winding drum or pulley operatively connected with the armature $f$ of said motor. Connected with the armature $f$ of the motor, by a chain or belt drive $b$, is a small generator, or dynamo electric machine B. As soon as the slacking of the cable $d$ causes the armature $f$ to revolve to wind up tension rope $e$, the armature of the dynamo is rotated with a speed proportional to the rotation of the armature $f$ and develops a current that is directly proportional to the relative increase in the number of rotations of the motor A due to the rotation of the armature $f$. The current from the dynamo B is conducted through a counter-compound winding of the motor A and thereby effects a weakening of the motor field to a degree corresponding to the increase in the relative speed of the motor. This causes a corresponding increase in the current flowing in the motor armature $f$ which produces a quicker response in the increase of the speed of the armature and therefore a practically instantaneous tightening of the winding or straining rope $c$, which restores the normal tension on cable $d$.

As is well known the counter E. M. F. of an electric motor is directly proportional to the speed of rotation of the armature and the strength of the field, or the number of lines of force cut per unit of time, and that the higher the counter E. M. F. the less the current flowing in the armature and the less the torque of the motor. By weakening the field the counter E. M. F. is reduced and the armature current and the torque increases, so that with a given load the armature speed increases until the counter E. M. F. again reaches its normal. It will be seen therefore that the ultimate effect of the counter current from dynamo B is to increase the speed and power of the motor armature $f$ in substantially the same proportion that the rotation of the normally stationary field frame increases the counter E. M. F. of the motor, and by careful adjustment of the current delivered to the motor A from the dynamo an exact compensation may be effected so that the portion of the motor operating the straining rope $e$ will respond instantly and effectively to restore the tension on cable $d$. Conversely when the magnetic field of the motor is increased, the counter E. M. F. is increased and the current through the armature decreases, hence the speed of the armature decreases until the counter E. M. F. again becomes normal. Therefore when the tension on cable $d$ becomes excessive, due to the vessels separating and the straining rope drives the armature $f$ in unwinding, the current delivered by compensating the dynamo B increases the field of motor A, decreasing the torque of the armature and relieving the excessive strain on the cable until the armature ceases its movement and normal tension of cable $d$ is restored.

For the purpose of this invention it is immaterial whether the motor A is a series, a shunt or a compound motor, and likewise the general effect is the same whether the energy of the compensating dynamo acts through a special winding on the motor or directly upon the energizing winding of said motor and it will be understood that the special case referred to in connection with Fig. 1 is merely illustrative of one mode of applying the invention. The essential feature of the invention is that the auxiliary dynamo B furnishes a compensating current only during the operation of the part of the motor which intermittently operates the straining rope $e$ to maintain a substantially uniform tension on cable $d$.

Instead of the foregoing connection between the dynamo B and the motor A, the arrangements illustrated in Figs. 2 and 3 may be employed. As shown in Fig. 2 the armature $c$ of the auxiliary dynamo is driven by the continuously rotating field frame $g$ of the motor and is connected in a shunt to the series field winding S of the motor. The field $s$ of the auxiliary dynamo is in series with the motor field S. With the field frame rotating to drive the traveling cable under normal strain or tension, the armature $c$ produces a counter E. M. F. $e/g$ so that only a slight current passes through said armature $c$ and shunt W. When the traveling cable becomes slack and the motor armature A begins to wind up the tension rope, the motor current declines owing to the increased counter E. M. F. developed by the motor. As the current in series-winding S of the motor and $s$ of the auxiliary dynamo decreases, the counter E. M. F. of the dynamo armature $c$ also decreases, and the current passing through shunt W and through the motor armature A increases, so that the torque of the motor is maintained substantially constant and armature A quickly responds to wind up the tension rope and restore the tension on the traveling cable, after which the system resumes its normal operation with the armature A stationary. During the rotation of the armature A should there occur an increase in the speed of rotating field frame $g$ due to the decreased load, an additional compensating winding $n$ may be employed, said winding being energized from armature $c$ and operating in opposition to the field winding $s$ of the auxiliary dynamo to neutralize the relative increase in the tension developed by armature $c$ in consequence of its increased speed. When the load on the motor increases due to an increase in the tension of the traveling cable, the armature A rotates in the opposite direction and the current through the motor is increased with a corresponding increase in the strength of field $s$ of the dynamo. The tension of the dynamo armature $c$ increases accordingly and sends current through the shunt W and field S of the motor thereby increasing the strength of the motor field and reducing the relative speed of rotation of the motor parts.

In the modification shown in Fig. 3, the armature $c$ of the regulating dynamo is driven by the rotating armature A of the motor which operates the straining rope $e$ and said armature $c$ is connected in the shunt field winding $n'$ of the motor. The field N of the dynamo may be energized from any suitable source. While the armature A of the motor is at rest the armature $c$ is also stationary and produces no current. When, however, armature A rotates to wind up straining rope $e$, armature $c$ of the dynamo produces an electro-motive force in opposition to that in the main motor circuit and weakens the current in the shunt field winding N resulting in an increase in the speed of armature A and a more rapid winding of the tension rope $e$. When the tension of the armature $c$ rises above that of the motor mains the current in shunt winding N is reversed and acts against the series winding S. When the tension rope $e$ is unwound and drives the armature A in the opposite direction, viz; in the same direction as the rotating field frame, the current developed by armature $c$ of the dynamo acts to strengthen the current in the shunt field winding N, thereby reducing the relative speed of the motor parts.

Obviously the auxiliary dynamo-electric machine may operate as a generator or as a motor with proper effect, provided that it is driven by the armature or the field frame of the main motor A or even by a separate motor.

What I claim is:—

1. In an electric cable-way system, the combination of an endless traveling cable, a straining rope to maintain a substantially uniform tension on said cable, an electric motor for operating the cable and straining rope, and a compensating dynamo electric machine in circuit with said motor operating concurrently with the actuating of the straining rope.

2. In an electric cable-way system, the combination of an endless traveling cable, a straining rope to maintain a substantially uniform tension on said cable, an electric motor for operating the cable and straining rope, and a compensating generator driven by the straining rope operating element of the motor, and energizing a compensating winding in the motor circuit.

3. In an electric cable-way system, the combination of an endless traveling cable, a straining rope to maintain a substantially uniform tension on said cable, an electric motor having independently rotatable field and armature elements for actuating the traveling cable and the straining rope, and a generator driven by the motor element operating the straining rope and energizing a compensating winding in the motor circuit.

Dated this the 28th day of March 1908.

In witness whereof I have hereunto set my hand in the presence of two witnesses.

OTTO ADAM.

Witnesses:
JEAN GRUND,
CARL GRUND.